Dec. 9, 1969 I. SCHERRER 3,483,485

TEMPERATURE-STABILISED CRYSTAL-CONTROLLED OSCILLATOR

Filed April 5, 1968 2 Sheets-Sheet 1

INVENTOR.
Igor SCHERRER
BY Kenwood Ross
ATTORNEY.

TEMPERATURE-STABILISED CRYSTAL-CONTROLLED OSCILLATOR

Filed April 5, 1968 2 Sheets-Sheet 2

INVENTOR.
Igor SCHERRER
BY Kenwood Ross
ATTORNEY.

United States Patent Office 3,483,485

Patented Dec. 9, 1969

3,483,485

TEMPERATURE-STABILISED CRYSTAL-CONTROLLED OSCILLATOR

Igor Scherrer, Colombier, Switzerland, assignor to Ebauches S.A., Neuchatel, Neuchatel, Switzerland, a firm of Switzerland Filed Apr. 5, 1968, Ser. No. 719,166
Claims priority, application Switzerland, Apr. 29, 1967, 6,167/67; Feb. 29, 1968, 3,064/68
Int. Cl. H03b 5/30, 5/36
U.S. Cl. 331—116 5 Claims

ABSTRACT OF THE DISCLOSURE

In a temperature-stabilised crystal-controlled oscillator, the feature that its circuit incorporates a variable capacitive element, constituted by a fixed capacitance and a variable-gain amplifier, the latter itself constituted by a fixed-gain amplifier and a variable attenuator, and the variable attenuator being constituted by a network of fixed resistors and thermistors, all in such a fashion that the oscillator is at least partially temperature-stabilised.

This invention relates to temperature-stabilised crystal-controlled oscillators.

Crystal-controlled oscillators always exhibit temperature-induced frequency drift as a result of variations in the elastic properties of crystals, which take place with fluctuations in temperature.

Figure 1:
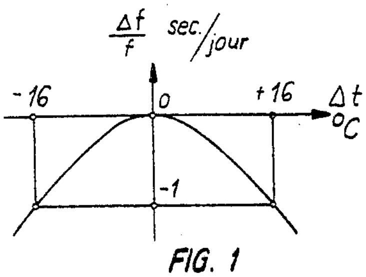

Calculations indicate that for low frequency crystals, for example X-cut+5°, the drift curve is a parabola, and this is illustrated in FIGURE 1 of the accompanying drawings. The peak, or inversion point, of this parabola, may be selected in advance to be for example 20° C. In this case, for a temperature interval $\Delta t$ of ±16° C., i.e. between 4 and 36° C., the crystal will exhibit a reduction $\Delta f/f$ in its frequency, of $1 \times 10^{-5}$, this corresponding to a loss of about 1 second per day in a situation where the oscillator is used as the basis of a clock device, for example.

This kind of drift is often unacceptable in practice. Although it can be reduced by using a thermostat to stabilise the temperature, this kind of approach is not always possible because it involves a substantial increase in the size of the instrument and its power consumption, rendering it also more susceptible to failure. These drawbacks can be overcome by employing purely electronic stabilising means.

Figure 2:
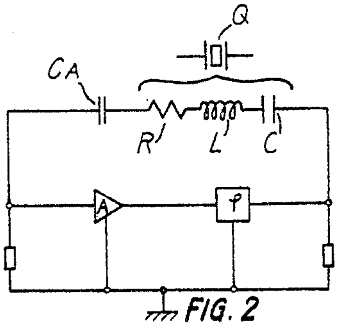

Let us consider the basic circuit of a crystal-controlled oscillator, as illustrated in FIGURE 2. A is an amplifier, $\rho$ a phase-shift network and $C_A$ a crystal tuning capacitor; the amplitude limiter has not been shown since it has no direct effect upon the frequency.

Compensation can be effected by regulating $C_A$ or $\rho$, since $$\frac{\Delta f}{f} = \frac{\tan \phi}{2Q}$$

the factor Q being the quality factor of the crystal and its value being given by $$Q = \frac{2\pi \cdot f \cdot L}{R}$$

where L and R are respectively the inductance and the series resistance of the crystal.

Compensation by regulation of $C_A$ can be achieved by employing a variable capacitance controlled by a bimetallic strip, or by using a D.C. voltage-controlled capacitor device. The drawback of these arrangements resides in the fact that, on the one hand, the bimetallic strip capacitive element has to be a precision mechanical component, needing very delicate adjustment, and, on the other hand, that the voltage control capacitor requires a very stable bias voltage which is too high for independent oscillators which have to run off a battery with only one or two cells.

Compensation by varying $\rho$ can give good results but gives rise to a complicated circuit. Moreover, the compensation then depends on the factor Q which may exhibit a wide degree of spread over a single batch of crystals, and this is inconvenient from a practical standpoint.

It is the aim of the present invention to provide a crystal-controlled oscillator which is substantially temperature-stabilised, by using means which do not present the drawbacks of the solutions aforementioned.

An oscillator in accordance with the invention is characterised by the fact that its circuit comprises a variable capacitive element in the form of a fixed capacitor and a variable-gain amplifier, the latter itself constituted by a fixed-gain amplifier and a variable attenuator, and once again the variable attenuator being constituted by a network of fixed resistors and thermistors, all in such a way that the oscillator is at least partially temperature-stabilised.

Figure 3:
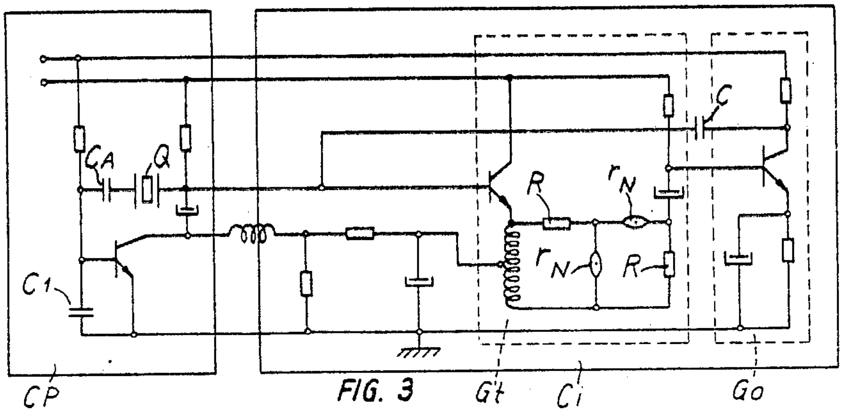
Figure 4:
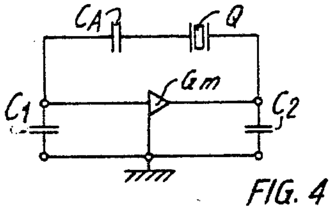
Figure 5:
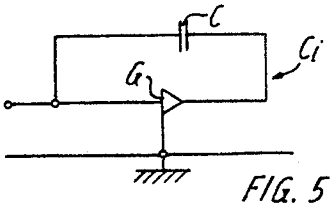
Figure 6:
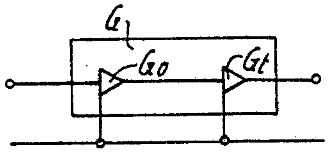
Figure 7:
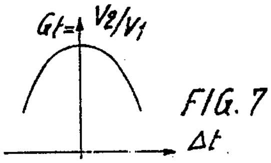
Figure 11:
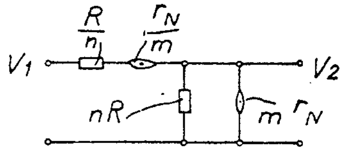
Figure 11A:
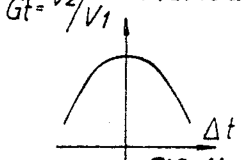
Figure 12:
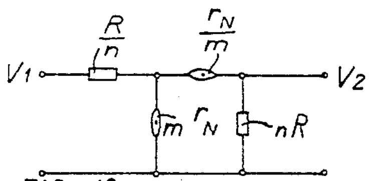
Figure 12A:
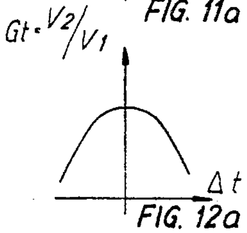
Figure 13:
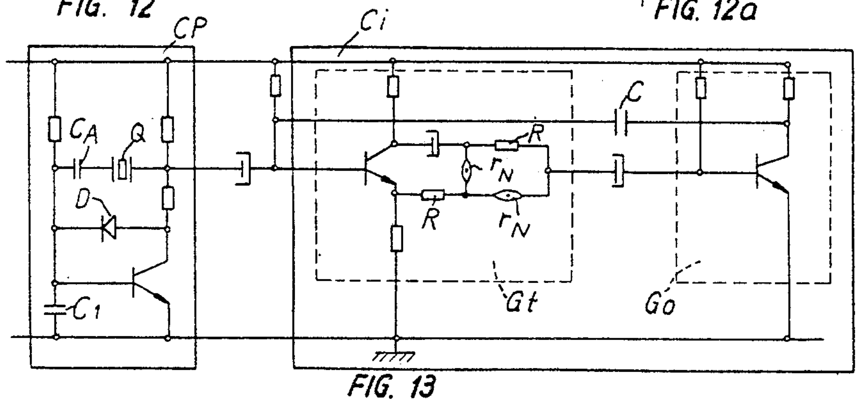
Figure 14:
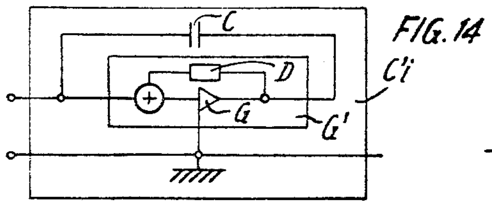
Figure 15:
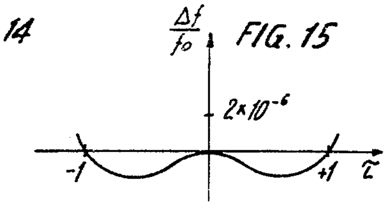

The invention will now be further described with reference to the accompanying drawings (FIGURES 1 and 2 of which have previously been referred to) and which illustrate, by way of example, two embodiments of the invention in the form of temperature-stabilised crystal-controlled oscillators, together with several modifications thereof. In the drawings:

FIGURE 1 is a diagram illustrating the temperature drift in a crystal cut in X+5° fashion, FIGURE 2 is a diagram illustrating the circuit of a conventional crystal-controlled oscillator, FIGURE 3 is a diagram illustrating the circuit of one embodiment of the invention, FIGURE 4 is a diagram illustrating the circuit of a conventional Colpitts-Pierce crystal-controlled oscillator, FIGURE 5 is a diagram of a capactive simulator, FIGURE 6 is a diagram of a variable-gain amplifier, FIGURE 7 is a compensation diagram, FIGURES 8 to 12 are diagrams representing the modifications, FIGURES 8*a* to 12*a* are compensation diagrams corresponding to circuits of FIGURES 8 to 12, respectively, FIGURE 13 is a diagram illustrating the circuit of the other embodiment of the invention, FIGURE 14 is a diagram of part of the circuit of a further modification, and FIGURE 15 is a compensation curve.

In the oscillator of FIGURE 3 the block marked CP is the equivalent of a Colpitts-Pierce oscillator, as shown in FIGURE 4, operating at a frequency $f$ given by:

$$(2\pi f)^2 L = \frac{1}{C_1} + \frac{1}{C_2} + \frac{1}{C_A}$$

In an oscillator of this kind, capacitances $C_1$ and $C_2$, connected in parallel with the amplifier $G_m$, have the same function as the tuning capacitance $C_A$.

However, in the circuit of FIGURE 4, one of these capacitances $C_1$ and $C_2$, in this case the capacitance $C_2$, has been removed and replaced by a capacitive simulator illustrated as a separate block marked $C_i$. This capacitive simulator $C_i$ is designed on the lines illustrated in FIGURE 5, the device here comprising an amplifier of gain G and a capacitor C connecting the input and the output of said amplifier. The input impedance $Z_i$ of a device of this kind is that of a capacitance $C_i$ equivalent to:

$$C_i = C(1-G)$$

This capacitance, one side of which is earthed, varies as a function of the gain G.

However, an amplifier having a gain varying as a function of temperature can be produced by combining an amplifier of fixed gain $G_0$ with an attenuator $G_t$ whose attenuation is a function of temperature, as indicated in FIGURE 6. In this case, $$G=G_0\cdot G_t$$

In the oscillator of FIGURE 3, the block $G_t$ constitutes an attenuator made up of fixed resistors R and negative temperature coefficient (hereinafter referred to as NTC) thermistors $r_N$. The attenuation $G_t=V_2/V_1$, the function of which is plotted in FIGURE 7, has a substantially parabolic form within a temperature range of around 50° C., so that the attenuator $G_t$ is suitable for compensating crystal drift, the drift function itself being a parabolic one, as shown in FIGURE 1.

It should be pointed out that by controlling R, the inversion points in the crystal drift function and in the function of the attenuator network $G_t$, can be made to coincide, whilst by regulating $G_0$ the requisite gain for correct compensation is produced. In theory, perfect compensation can be effected at three points, namely $-\Delta t$, 0, $+\Delta t$; at other points, the discrepancy is generally very small. This oscillator can operate with very low supply voltages, of the order of 1 volt, and a current of the order of 100 $\mu$a., i.e. $10^{-4}$ amperes.

FIGURES 8 to 12 indicate how attenuators may be produced using fixed resistors R and NTC thermistors $r_N$ and/or positive temperature coefficient (hereinafter referred to as PTC) $r_p$. FIGURES 8*a* to 12*a* are diagrams of the attenuation $G_t$ produced by each of the attenuators of FIGURES 8 to 12, respectively. In each case, the attenuation function $G_t=V_2/V_1$ is substantially parabolic within a temperature range of around 50° C. A bridge circuit enables the curve $V_2/V_1$ to be shifted so that $V_2/V_1=0$ for $\Delta t=0$.

In FIGURES 11 and 12, the factors *m* and *n* can be arbitrary positive numbers; they influence the curvature of the parabola which will advantageously be as high as possible, but do not affect the position of its peak or point of inversion. To this end, the network of FIGURE 12, in which $m=1$ and $n=2$, is particularly interesting.

Figure 8:
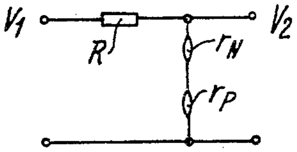
Figure 8A:
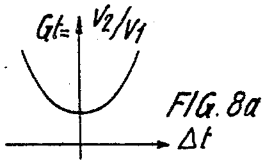
Figure 9:
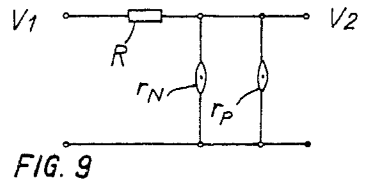
Figure 9A:
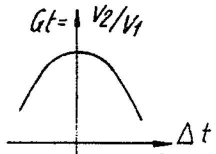
Figure 10:
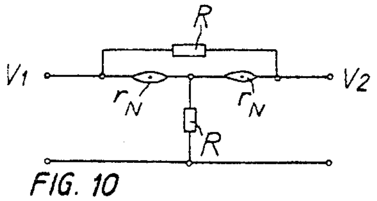
Figure 10A:
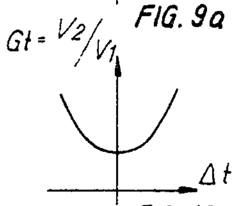

The point of inversion in the functions of the attenuators of FIGURES 8 and 9 can be shifted by modifying the ratio $r_p/r_N$; for the attenuators in FIGURES 10, 11 and 12, the ratio $R/r_N$ has to be modified.

FIGURE 13 illustrates an oscillator similar to that of FIGURE 3, but in which the inductance and the transformer have been eliminated, and the diode D being provided as an amplitude limiter. This oscillator thus has the advantage of being more compact than the circuit of FIGURE 3. As in the first embodiment, it has a part CP which is the equivalent of a Colpitts-Pierce crystal-controlled oscillator, one of the capacitors in which has been replaced by a capacitive simulator $C_I$. The latter, as in the first embodiment, incorporates a fixed capacitor C, a fixed-gain amplifier $G_0$ and a variable attenuator $G_t$, the latter constituted by a network of resistors R and thermistors $r_N$, which ensure that the attenuation varies parabolically as a function of temperature.

The aim of the modification of FIGURE 14 is to further improve temperature compensation in relation to that achieved with the foregoing embodiments.

As explained hereinbefore, low frequency crystals of X+5° cut, or similar, have a parabolic drift function (FIGURE 1), i.e. a parabolic relationship between their fundamental frequency *f* and the temperature, which is given by:

$$\frac{f}{f_0}=1-q\tau^2 \quad (1)$$

where $q\cong 1\times 10^{-5}$ $$\tau=\frac{\Delta t}{(\Delta t)_0}$$

$(\Delta t)_0=16°$ C.

The equivalent circuit diagram, in normal operation, is that of a series R, L, C circuit, where:

$$(2\pi f)^2\cdot L\cdot C=1 \quad (2)$$

Physical considerations lead to the conclusion that it is C, and not L, which varies as a function of temperature. In other words, C, which is the equivalent of an elasticity, is variable, whereas L, which is the equivalent of a moment of inertia, can only vary as a consequence of expansion effects, which are very small. R, which is the equivalent of a loss, does not affect *f* (Equation 1), but does vary widely.

If we put $L=L_0$=constant, then by combining Equations 2 and 1, we get:

$$C=\frac{C_0}{(1-q\tau^2)^2}\simeq\frac{C_0}{1-2q\tau^2} \quad (3)$$

where $C_0$ is the value of C for which $\tau=0$. (This approximation is very close since $\tau\ll 1$ and $q=10^{-5}$, so that $q^2\tau^4\ll 2q^2$.)

If we put a compensating capacitance C′ in series wtih C, so that we get a constant capacitance Γ, then:

$$\frac{1}{C}+\frac{1}{C'}=\frac{1}{\Gamma}=\text{constant} \quad (4)$$

By introducing into Equation 4 the approximate value of C given by (3), we get C′:

$$C'=\frac{C'_0}{1+2q'\tau^2} \quad (5)$$

with $$\left.\begin{aligned} q'&=\frac{qC'_0}{C_0}\\ \frac{1}{C_0}+\frac{1}{C'_0}&=\frac{1}{\Gamma}\end{aligned}\right\} \quad (6)$$

Thus, to achieve correct compensation of the crystal frequency as a function of temperature, the compensating capacitance C′ must be linked to $\tau$ by Equation 5.

If, in the embodiments hereinbefore described, the input inpedance of the amplifier $G_0$ is infinite, and if the output impedance of the attenuator $G_t$ is zero, then the compensating capacitance $C_i$ is a pure capacitance, and is given by:

$$C_i=C(1-G)$$

where $G=G_0\cdot G_t$ and $G_t=B_0\tau^2$, $B_0$ being a constant (attenuation factor).

The result of this is that $$C_i=C(1-G_0B_0\tau^2) \quad (7)$$

It will be seen that $C_I$, and C′, reduces as $\tau$ increases, but their laws are different.

If we replace C′ by $C_i$, the compensation curve has the shape shown in FIGURE 15. In order to improve this compensation, negative feedback is applied to the variable gain amplifier G, through a 180° phase-shift element D, as indicated in FIGURE 14.

G′, the gain through the amplifier G with negative-feedback, is given by:

$$G'=\frac{G}{1+G} \quad (8)$$

The input capacitance $C'_i$ of the circuit of FIGURE 14 is given by:

$$C'_i=C(1-G')=C\left(1-\frac{G}{1+G}\right)=\frac{C}{1+G} \quad (9)$$

from which we get:

$$C'_1=\frac{C}{1+G_0B_0\tau^2},$$

since $G = G_0B_0\,\tau^2$.

It will be seen that $C'_1$ as given by Equation 9 has precisely the form required by Equation 5, so that all that is necessary is to regulate $G_0$ so that $$G_0=\frac{2q}{B_0}\cdot\frac{C'_0}{C_0} \quad (10)$$

in order to obtain perfect compensation.

It should be pointed out that the oscillator in accordance with the invention will preferably take the form of a modified version of the Colpitts-Pierce oscillator, rather than a more conventional kind of oscillator such as shown in FIGURE 1, since the fact that the capacitive simulator used (FIGURE 5) must be earthed at one side, prevents it from being directly connected in the same way as the capacitor $C_A$ in the circuit of FIGURE 1.

The oscillator in accordance with the invention presents the advantage of enabling a very high degree of temperature compensation, and possibly even total temperature compensation, to be achieved, although the means used for the purpose are independent of the quality factor Q of the crystal and circuitry is kept simple, the current consumption being kept low.

What I claim is:

1. In a temperature-stabilised crystal-controlled oscillator, the feature that its circuit incorporates a variable capacitive element, constituted by a fixed capacitance and a variable-gain amplifier, the latter itself constituted by a fixed-gain amplifier and a variable attenuator, and the variable attenuator being constituted by a network of fixed resistors and thermistors, all in such a fashion that the oscillator is at least partially temperature-stabilised.

2. Oscillator as claimed in claim 1, in which the thermistors used in said circuit are of the negative temperature coefficient type.

3. Oscillator as claimed in claim 1, in which the thermistors used in said circuit are of the positive temperature coefficient type.

4. Oscillator as claimed in claim 1, in which the circuit is a Colpitts-Pierce circuit using two capacitors in parallel with an amplifier, the feature that the said variable capacitive element replaces one of said capacitors.

5. Oscillator as claimed in claim 1, in which negative feedback is applied to the variable-gain amplifier in order to improve the temperature compensation it achieves.

No references cited.

JOHN KOMINSKI, Primary Examiner

U.S. Cl. X.R.

331—176; 333—80; 334—15